United States Patent [19]

Torimoto et al.

[11] Patent Number: 5,321,630

[45] Date of Patent: Jun. 14, 1994

[54] METHOD OF DETECTING A LAYER LEVEL CONDITION

[75] Inventors: Yoshifumi Torimoto; Junichi Nakamura; Keiichi Tsuto, all of Wakayama; Iori Hashimoto, Kyoto; Takeshi Fujiwara, Hirakata; Kenichiro Sotowa, Kyoto, all of Japan

[73] Assignee: Kao Corporation, Tokyo, Japan

[21] Appl. No.: 783,128

[22] Filed: Oct. 28, 1991

[30] Foreign Application Priority Data

Nov. 1, 1990 [JP] Japan .................. 2-298651
Apr. 15, 1991 [JP] Japan .................. 3-082268

[51] Int. Cl.⁵ .......................................... G01K 13/10
[52] U.S. Cl. ........................................ 364/556; 340/621
[58] Field of Search ............... 364/556, 502, 500, 558, 364/148; 73/53.01, 53.02, 304 C, 864.24, 299; 324/662, 663, 671; 340/621

[56] References Cited

U.S. PATENT DOCUMENTS

| | | | |
|---|---|---|---|
| 3,886,795 | 6/1975 | Thompson | 73/299 |
| 4,280,126 | 7/1981 | White | 340/621 |
| 4,591,946 | 5/1986 | Pope | 73/304 C |
| 4,858,147 | 8/1989 | Couwell | 364/148 |
| 4,888,981 | 12/1989 | Johansen et al. | 73/53.01 |
| 4,949,572 | 8/1990 | Wilen et al. | 73/53.01 |
| 5,012,683 | 5/1991 | Davis | 73/864.24 |
| 5,033,321 | 7/1991 | Gerson | 73/53.01 |

FOREIGN PATENT DOCUMENTS 1543241  2/1990  U.S.S.R. ............... 73/53.01

Primary Examiner—Jack B. Harvey
Assistant Examiner—Thomas Peeso

[57] ABSTRACT

A method of detecting the condition of a liquid layer level in a case where a plurality of liquids are in a layer condition, such method of being capable of knowing each layer level condition even in a case where a system as a whole is high at temperature, pressure or dirt as well as emulsification are large in extent. In order to detect the layer condition, the measurement values of temperatures and so on in a system as a whole or the mathematically processed values of the measurement values are provided as inputs, the layer level condition at this time is outputted, processed by a neurocomputer so as to compose an input-output model. As the layer level condition at this time is adapted to be estimated with the use of the input-output model, the layer level condition may be properly detected even when a system as a whole is high at temperature, pressure or the dirt as well as the emulsification are larger in extent.

5 Claims, 5 Drawing Sheets

METHOD OF DETECTING A LAYER LEVEL CONDITION

BACKGROUND OF THE INVENTION

The present invention relates to a method of detecting the condition of a liquid layer level in a case where a plurality of liquids are in a layer condition.

In a fat-splitting tower, water is fed from its upper portion, oil such as fats and oils or the like which is smaller in specific gravity than the water is continuously fed from its lower portion, the oil and the water are brought into contact under a thermal source by steam so as to cause hydrolysis reaction for splitting the oil. By the difference in specific gravity, the oil exists in the upper portion, and the water exists in the lower portion, thus causing a interface where they are in contact with each other.

If the interface rises higher than a proper level, the residence time of the oil within the tower becomes shorter so as to deteriorate a reaction (oil splitting) factor. If the interface lowers, the oil is mixed into the exhaust water so as to lose the oil. Therefore, it is necessary to correctly, know the position of the interface. Thus, the layer level condition is periodically assured by an visual inspection of the liquid sampled from portions in the vertical direction of the tower.

But in the visual inspecting operation of the liquid sampling, it is difficult to determine the layer condition with a time series comparison, because the sampling marks are restricted. Although there is a method of detecting the interface from the measurement of specific gravity, electric conductivity, light transmission degree or the like which is caused by the oil and the water, it is difficult to detect the interface by these measurements when a system as a whole is high in temperature and pressure, and dirt as well as emulsification are large in extent.

SUMMARY THE INVENTION

Accordingly, the present invention has been developed with a view to substantially eliminating the above discussed drawbacks inherent in the prior art, and has for this essential object to provide an improved way as a novel detecting method.

Another important object of the present invention is to provide a novel detecting method capable of determining each layer level condition even in a case where a system as a whole is high in temperature and pressure, or dirt as well as emulsification are large in extent.

When the actual layer level condition visually inspected has been outputted with the measurement values of tower temperature, pressure, flow rate and so on obtained in the system being provided as input, it is considered that some correlated relation exists between both of them. The layer level condition detecting method of the present invention introduces the idea of neurocomputer having a learning function which has a flexible information processing capacity through the imitation of information processing in human brains with measured values as inputs (temperature within a tower, pressure, flow rate and so on) and visual layer level condition as outputs. The correlated relation is solved. A layer level condition at this time may be detected if a system as a whole is in any condition with the use of the correlated relation.

Namely, the present invention is a method of detecting a layer level condition when vertically different liquids are layers in a system as a whole, comprising the steps of inputting to a neurocomputer measurement values to be obtained in a time series comparison from such a system or the values in accordance with the measured values, comparing a signal to be outputted by the neurocomputer with a signal showing a layer level condition found out by the actual sampling at this time, adjusting the weights showing the strength of the combination from the input in the neurocomputer to the output until the difference between both the signals become a normal value or lower, making an input-output model having as a coefficient the adjusted weight, inputting either the measurement values or the values in accordance with the measurement values to the input-output model, and recognizing the layer level condition from the output at this time.

As the input to an input-output model, the measurement values of the tower inside temperature, the pressure, the flow rate and so on may be provided as they are. Or the mathematically processed statistical values of the measurement values may be used. As statistical values, the variance or average values is represented.

When a plurality of data is obtained in a time series comparison, the variance is obtained as a representative value of the data. It is generally obtained in a numerical formula 1.

$$\sigma = \frac{1}{M} \left\{ \sum_{i=1}^{M} (Xi - AVE) \right\} \quad (1)$$

wherein
M: measurement data number
AVE: average value of M number of data
Xi: individual measurement data With attention being fixed upon the component of a certain frequency band from among the measurement data, it is necessary to remove from the measurement data the component of the frequency band except for it. An example in extracting the high frequency component from among, for example, the measurement data is shown hereinafter.

An average value with respect to front, rear N points with a certain data as a center is obtained in a numerical formula 2. Such average value is obtained by M number through the sequential sliding of the center data, so that a low frequency component XLi is obtained. The numerical processing is called a moving average.

$$XLi = \frac{1}{2N+1} \left( \sum_{K=-N}^{N} X_K \right) \quad (2)$$

As shown in a numerical formula 3, a high frequency component XHi is obtained by subtraction of a low frequency component XLi from a measurement data Xi.

$$XHi = Xi - XLi \quad (3)$$

Variance (moving variance) is obtained by the numerical formula 1 with respect to the high frequency component XHi so as to make the moving variance the input of a neurocomputer.

Also, a case may be suitable if a value is used in accordance of the temperature in the vertical direction of a system as a whole, as an input value to the neurocomputer. For example, an average value of a temperature measurement value is obtained for each portion in the vertical direction. The temperature difference which is separated between above and below is calculated, and the temperature difference between the average values of the above described temperature measurement values is used as input to the neurocomputer.

Also, as another example, an average value of the low frequency component to be included in the temperature measurement value for each portion in the vertical direction is obtained and a difference which is separated between above and below the average, and is provided between the average values of the above described low frequency components is used as the input to the neurocomputer. The low frequency component is obtained by the numerical formula 2.

As the neurocomputer is explained in, for example, a "neurocomputer" (Technique Review Company (Gijutsu Hyoron Sha), issued Sep. 15, 1989) written by Kaoru NAKANO, the detailed description thereof will be omitted here.

A unit having a following function is considered an artificial model of a neuron (brain cell).

As shown in FIG. 1, weights Wi are respectively attached to a plurality of data xi, with these total X ($=\Sigma xi \cdot Wi$) being inputs. It is threshold-value processed with a certain response function so as to obtain an output y.

$$y = f(\Sigma xi \cdot Wi)$$

Therefore, the unit is considered a saturation type non-liner element having a threshold value characteristic of multi-input/single-output. Such unit is connected to each other like network so as to vary the strength of the combination among the respective units by the adjustment of the weights Wi. The neurocomputer obtained from such construction effects parallel processing operation as in the brain cell and a learning function as a maximum characteristic.

As shown in FIG. 2, the data of the operating conditions such as temperature and so on in each place in a different layer is inputted into a neuro 2 in a weight $W_0$ of an initial value to be given from a weight setting portion 1. A signal showing a layer level condition outputted from a neuro 2 at this time and a signal showing a layer condition determined by an actual sample extraction at this time as a correct signal (hereinafter referred to as teaching signal) are compared for valuation in a comparison valuation portion 3. A weight Wi to be outputted from the weight setting portion 1 is adjusted in accordance with an instruction from the comparison valuation portion 3 and the computation is repeated until the differences become prescribed values or lower. In this manner, the weight is self-adjusted so as to suit the external environment so as to have proper judgment performance. Such function is called learning.

A neurocomputer to be used in the present invention is developed by simulation through software on an existing computer.

Detection of a layer level condition using a neurocomputer will be described hereinafter in detail.

In the present embodiment, as shown in FIG. 3, a circuit network of three-layer construction with an intermediate layer being provided between input and output layers is considered. Input Uj into an intermediate layer is defined as follows when input to an input layer of a neurocomputer is Ii, output from an output layer at this time is Ok.

$$Uj = \Sigma Wji \cdot Ii + \theta j \quad (4)$$

(W is a combination coefficient between an input layer and an intermediate layer, $\theta$ is an offset value)

Assume that a response function in the intermediate layer is f, the output Hj of the intermediate layer is as follows.

$$Hj = f(Uj) \quad (5)$$

Input Sk to an output layer is as follows.

$$Sk = \Sigma Vkj \cdot Hj + \gamma k \quad (6)$$

(V is a combination coefficient between an intermediate layer and an output layer, $\gamma$ is an offset value)

$$Ok = f(Sk) \quad (7)$$

When a sigmoid function is used as a response function f, the performance of the neurocomputer can be improved.

When an error $\delta k$ with respect to an offset of a unit between an intermediate layer and an output layer is obtained from the difference between the output Ok and a teaching signal Tk, $$\delta k = (Ok - Tk) \cdot Ok \cdot (1 - Ok) \quad (8)$$

With respect to an error $\delta k$, a combination coefficient Vkj to an output layer from an intermediate layer, a combination coefficient to be connected with an intermediate layer unit j from an output Hj of an intermediate layer, and the offset of an intermediate layer unit, an error $\sigma j$ is obtained, $$\sigma j = \Sigma \delta k \cdot Vkj \cdot Hj \cdot (1 - Hj) \quad (9)$$

A product among an error $\delta k$ in an output layer unit k obtained by a numerical formula 8, output Hj of an intermediate layer unit j and a constant $\alpha$ is added so as to correct a combination coefficient Vkj to be connected with a unit k of an output layer from an intermediate layer unit j.

$$Vkj = Vkj + \alpha \cdot \delta k \cdot Hj \quad (10)$$

Also, a product between an error $\delta k$ and a constant $\beta$ is added so as to correct an offset value $\gamma k$ of an output layer unit k.

$$\gamma k = \gamma k + \beta \cdot \delta k \quad (11)$$

Further, a combination coefficient Wji connected with an intermediate layer unit j from an input layer unit i and an offset $\theta j$ of the intermediate layer unit j are corrected similarly with the use of an error $\delta j$ in an intermediate layer unit j.

$$Wji = Wji + \alpha \cdot \sigma k \cdot Ii \quad (12)$$

$$\theta j = \theta j + \beta \cdot \sigma k \quad (13)$$

A model formula showing the relation between the input and the output is obtained with the use of combination coefficients W, V and offset values $\theta$, $\gamma$ converged in the error between the output and the teaching signal in this manner.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
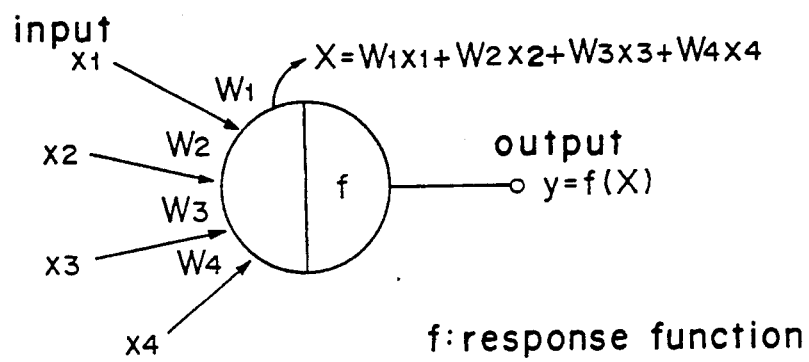
FIG. 1 is a view showing a basic unit composing a neurocomputer used in the present invention.
Figure 2:
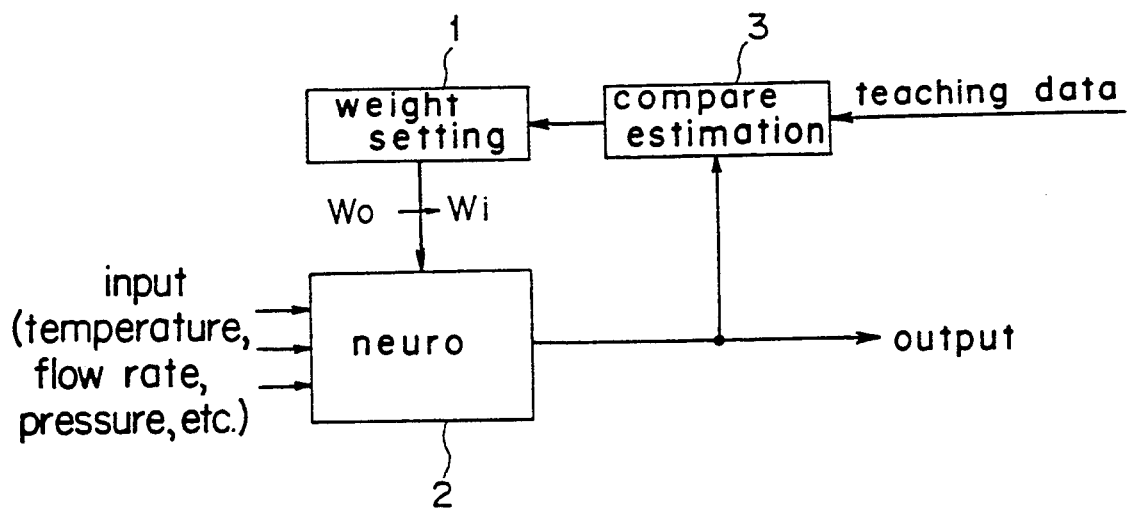
FIG. 2 is a block diagram showing the outline of a neurocomputer.
Figure 3:
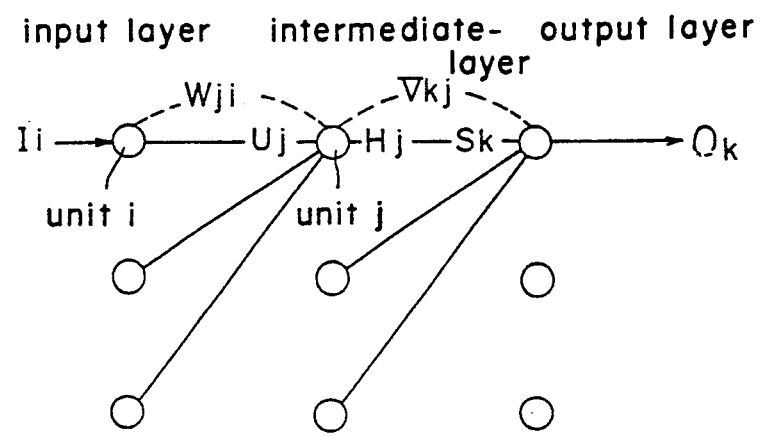
FIG. 3 is a view showing the combination among the respective layers in a neurocomputer of a three-layer construction.

Before the description of the present invention proceeds, it is to be noted that like parts are designated by like reference numerals throughout the accompanying drawings.

EMBODIMENT

Example 1

Figure 4:
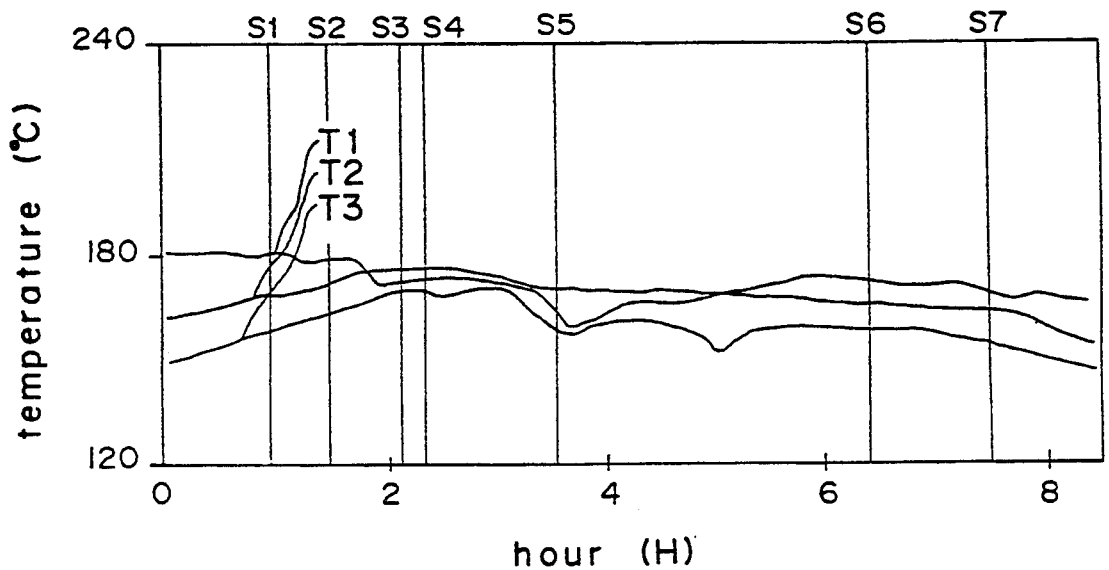
FIG. 4 is a chart showing the time lapse data of detection temperatures in the respective sampling positions in a first embodiment.

One example of the time lapse data of temperatures T1, T2 and T3 of the respective portions (sampling positions) of an upper, an intermediate portion and a lower portion in a fat-splitting tower is shown in FIG. 4. The respective temperatures T1 through T3 in the sampling time S1 through S7 are substituted into an input Ii in the numerical formula 4, further values of W, V, $\theta$, $\gamma$ generated by a random function generator are inputted into a numerical formula 4 through a numerical formula 6 so as to obtain output O in a model formula of the input, output from a numerical formula 7.

Samples (1) through (3) investigated in the above described sampling positions are used as teaching data which become the comparison references of the output O. The teaching data are expressed as in Table 1 so as to suit matrix computation to be described later. In Table 1, the presence or absence of oil, emulsion, water are shown with "1", "0", respectively. For example, in the sampling time $S_2$, the samples (1) through (3) are respectively shown to be in the layers of oil, emulsion, emulsion.

(TABLE 1)

|  |  | S1 | S2 | S3 | S4 | S5 | S6 | S7 |
|---|---|---|---|---|---|---|---|---|
| Sample (1) | Oil | 0 | 1 | 1 | 1 | 1 | 0 | 0 |

(TABLE 1)-continued

|  |  | S1 | S2 | S3 | S4 | S5 | S6 | S7 |
|---|---|---|---|---|---|---|---|---|
|  | Emulsion | 0 | 0 | 0 | 0 | 0 | 1 | 1 |
|  | Water | 1 | 0 | 0 | 0 | 0 | 0 | 0 |
| Sample (2) | Oil | 0 | 0 | 1 | 0 | 0 | 0 | 0 |
|  | Emulsion | 0 | 1 | 0 | 1 | 1 | 1 | 1 |
|  | Water | 1 | 0 | 0 | 0 | 0 | 0 | 0 |
| Sample (3) | Oil | 0 | 0 | 0 | 0 | 0 | 0 | 0 |
|  | Emulsion | 0 | 1 | 1 | 1 | 1 | 1 | 1 |
|  | Water | 1 | 0 | 0 | 0 | 0 | 0 | 0 |

As the computation, the square of the error between the output O (oil, water or emulsion) obtained by input (temperatures T1 through T3) in the sampling positions about the respective sampling time S1 through S7, and the teaching data (oil, water or emulsion) is obtained for each of oil, water and emulsion in the samples (1) through (3). The total of the square is computed at the sampling time S1 through S7. The combination coefficients W, V and the offset values $\theta$, $\gamma$ are adjusted until the total becomes 0.05 or lower, and are inputted into the numerical formula 4 through the numerical formula 13 so as to repeat the computation.

In the computation of the above described formula, the matrix is used. From the numerical formula 4 and the numerical formula 5, $$f(\Sigma W_{ji} \cdot I_i + \theta_i) = H_j \tag{14}$$

As an actual computation formula of the numerical formula 14, $$f\left(\begin{bmatrix} W11 & W12 & W13 \\ W21 & W22 & W23 \\ W31 & W32 & W33 \end{bmatrix} \begin{bmatrix} T1 \\ T2 \\ T3 \end{bmatrix} + \begin{bmatrix} \theta1 \\ \theta2 \\ \theta3 \end{bmatrix}\right) = \begin{bmatrix} H1 \\ H2 \\ H3 \end{bmatrix} \tag{15}$$

is used. Or from the numerical formula 6 and the numerical formula 7, $$f(\Sigma V_{kj} \cdot H_j \cdot H_j + \gamma_k) = O_k \tag{16}$$

is obtained. As the actual computation formula of the numerical formula 16, $$f\left([H1 \quad H2 \quad H3] \begin{bmatrix} V1 \\ V2 \\ V3 \end{bmatrix} + \begin{bmatrix} \gamma1 \\ \gamma2 \\ \gamma3 \end{bmatrix}\right) = \begin{bmatrix} O1 \\ O2 \\ O3 \end{bmatrix} \tag{17}$$

is used.

The combination coefficients W, V and the offset values $\theta$, $\gamma$ obtained respectively with respect to the samples (1) through (3) obtained in the sampling positions in this manner are shown in Table 2 through Table 4.

(TABLE 2)

| Sample (1) | | | |
|---|---|---|---|
| W | $\theta$ | V | $\gamma$ |
| Oil | | | |
| $\begin{bmatrix} -0.005 & -0.684 & -0.425 \\ 0.017 & 0.837 & -0.699 \\ 0.364 & -0.576 & -0.012 \end{bmatrix}$ | $\begin{bmatrix} 0.641 \\ 0.631 \\ 0.019 \end{bmatrix}$ | -0.017 | 0.531 |
| Water | | | |
| $\begin{bmatrix} 0.962 & 0.064 & 0.528 \\ 0.289 & 0.530 & 0.056 \\ 0.643 & -0.700 & 0.249 \end{bmatrix}$ | $\begin{bmatrix} 0.019 \\ 0.559 \\ 0.186 \end{bmatrix}$ | -0.658 | 0.437 |

(TABLE 2)-continued

Sample (1)

Emulsion $$\begin{bmatrix} -0.049 & 0.114 & 0.206 \\ 0.677 & -0.16 & -0.425 \\ -0.437 & -0.445 & -0.033 \end{bmatrix} \begin{bmatrix} 0.292 \\ 0.124 \\ 0.337 \end{bmatrix} \quad 1.270 \quad 0.497$$

(TABLE 3)

Sample (2)

W　　　　　　　　　θ　　　V　　γ

Oil $$\begin{bmatrix} 0.239 & -0.552 & -0.414 \\ 0.106 & 0.784 & -0.748 \\ 0.354 & -.0333 & 0.330 \end{bmatrix} \begin{bmatrix} 0.868 \\ 0.644 \\ -0.003 \end{bmatrix} \quad 0.726 \quad 0.633$$

Water $$\begin{bmatrix} 0.928 & 0.035 & 0.502 \\ 0.241 & 0.517 & 0.551 \\ 0.633 & -0.732 & 0.203 \end{bmatrix} \begin{bmatrix} -0.249 \\ 0.519 \\ 0.389 \end{bmatrix} \quad -0.517 \quad 0.601$$

Emulsion $$\begin{bmatrix} -1.670 & 0.775 & 0.095 \\ 0.527 & -0.311 & -0.261 \\ -0.483 & -0.602 & 0.080 \end{bmatrix} \begin{bmatrix} 0.837 \\ -0.209 \\ 0.426 \end{bmatrix} \quad -0.686 \quad 0.570$$

(TABLE 4)

Sample (3)

W　　　　　　　　　θ　　　V　　γ

Oil $$\begin{bmatrix} -0.235 & -0.768 & -0.046 \\ 0.919 & 2.050 & 0.337 \\ 1.326 & -0.817 & -0.585 \end{bmatrix} \begin{bmatrix} 0.419 \\ 0.643 \\ -0.277 \end{bmatrix} \quad -2.25 \quad 0.236$$

Water $$\begin{bmatrix} 0.923 & 0.037 & 0.531 \\ 0.249 & 0.493 & 0.553 \\ 0.636 & -0.727 & 0.193 \end{bmatrix} \begin{bmatrix} -0.179 \\ 0.714 \\ 0.189 \end{bmatrix} \quad -1.104 \quad 0.434$$

Emulsion $$\begin{bmatrix} 0.241 & -0.003 & 1.762 \\ 0.373 & -0.457 & -0.044 \\ -0.814 & -0.514 & -0.177 \end{bmatrix} \begin{bmatrix} 0.058 \\ 0.153 \\ -0.027 \end{bmatrix} \quad -3.179 \quad 0.132$$

After obtaining an input-output model formula made with the use of the respective coefficients in the above described table, the estimate of the layer condition may be effected as shown hereinafter from the input-output model formula.

Figure 5:
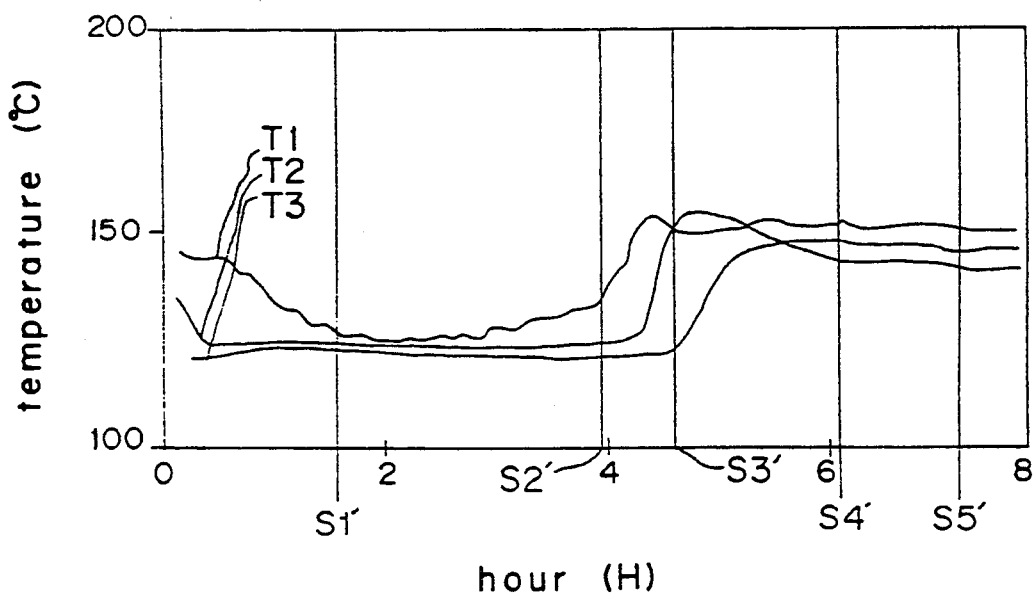
FIG. 5 is a chart showing the time lapse data of detection temperatures in the respective sampling positions used for the estimate in the first embodiment.

Time lapse temperature data shown in FIG. 5 are used as an input value to be used for the estimate. The respective temperatures T1 through T3 in the sampling time S1' through S5' are inputted into an input-output model formula so as to show the obtained output values in FIG. 6.

Figure 6:
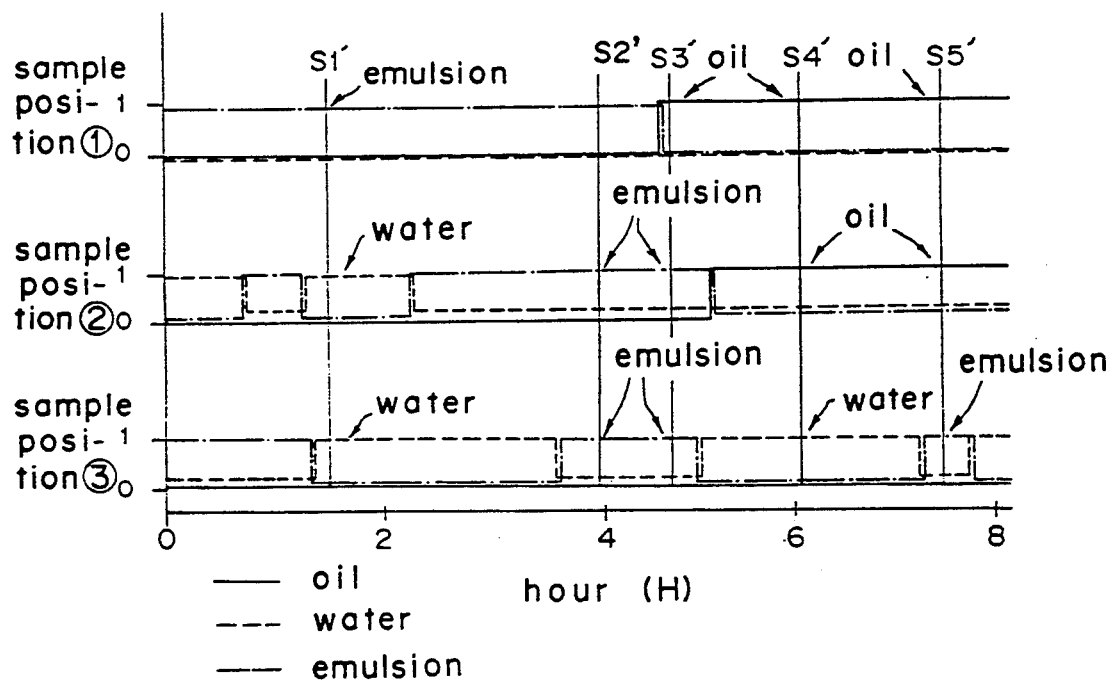
FIG. 6 is a chart showing a layer condition obtained in the first embodiment.

In FIG. 6, the presence, absence of the oil, water and emulsion are shown as "1", "0". With respect to, for example, the sample position (2), it is estimated that the water layer (a break line showing the water is "1" level) is shown at the sampling time S1', the emulsion layer (one dot break line showing the emulsion is "1" level) at the sampling time S2' and S3', and the oil layer (thin line showing the oil is "1" level) at the sampling time S4' through S5'.

The layer condition of the samples (1) through (3) investigated in the above described sampling positions is shown in Table 5 as the data for comparison use with respect to the estimated output value in this manner.

(TABLE 5)

|  |  | S1' | S2' | S3' | S4' | S5' |
|---|---|---|---|---|---|---|
| Sample (1) | Oil | 0 | 0 | 1 | 1 | 1 |

(TABLE 5)-continued

|  |  | S1' | S2' | S3' | S4' | S5' |
|---|---|---|---|---|---|---|
|  | Emulsion | 1 | 1 | 0 | 0 | 0 |
|  | Water | 0 | 0 | 0 | 0 | 0 |
| Sample (2) | Oil | 0 | 0 | 0 | 1 | 1 |
|  | Emulsion | 0 | 1 | 1 | 0 | 0 |
|  | Water | 1 | 0 | 0 | 0 | 0 |
| Sample (3) | Oil | 0 | 0 | 0 | 0 | 0 |
|  | Emulsion | 0 | 1 | 1 | 0 | 1 |
|  | Water | 1 | 0 | 0 | 1 | 0 |

As clear from the comparison between the estimate value of FIG. 6 and the comparison data of Table 5, it is confirmed to be considerably coincident in conformity.

Example 2

Figure 7:
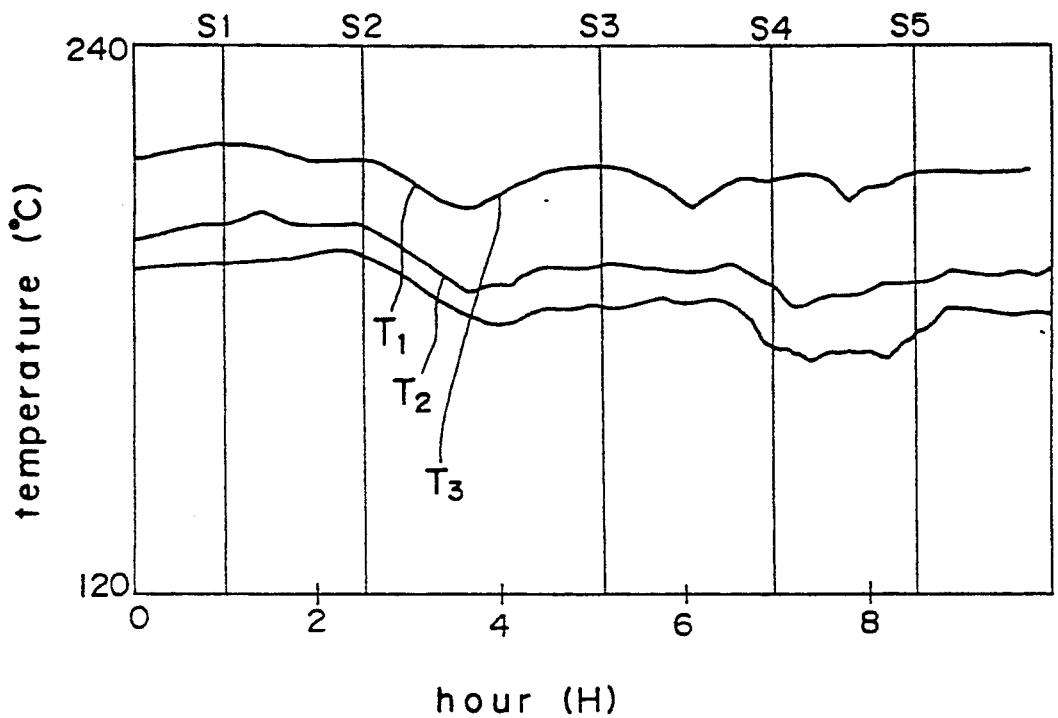
FIG. 7 is a chart showing the time lapse data of detection temperatures in the respective sampling positions in a second embodiment.

One example of the time lapse data of temperatures T1, T2 and T3 of the respective portions in the upper portion, the intermediate portion and the lower portion in the fat-splitting tower is shown in FIG. 7. In the present embodiment, the measurement values of the temperature T1 through T3 detected at the sampling time S1 through S5 are not substituted as they are into the numerical formula 4. Moving scatter values are respectively obtained with respect to the temperatures T1 through T3 and the moving scatter values are substituted as inputs Ii in the numerical formula 4. The data in the Table 6 are used as the teaching data with respect to the output O at this time. In the table 6, the presence or absence of the oil, emulsion, water are shown in "1", "0", respectively, as in Table 1.

(TABLE 6)

|  |  | S1 | S2 | S3 | S4 | S5 |
|---|---|---|---|---|---|---|
| Sample (1) | Oil | 1 | 1 | 1 | 1 | 0 |
|  | Emulsion | 0 | 0 | 0 | 0 | 1 |
|  | Water | 1 | 0 | 0 | 0 | 0 |
| Sample (2) | Oil | 0 | 1 | 0 | 0 | 0 |
|  | Emulsion | 0 | 0 | 1 | 1 | 1 |
|  | Water | 0 | 0 | 0 | 0 | 0 |
| Sample (3) | Oil | 0 | 0 | 0 | 0 | 0 |
|  | Emulsion | 0 | 0 | 1 | 1 | 1 |
|  | Water | 1 | 1 | 0 | 0 | 0 |

The computation is completely the same as in the previous embodiment. The respective combination coefficients W, V and offset values θ, γ with respect to the samples (1) through (3) in this case are shown in Table 7 through Table 9.

(TABLE 7)

Sample (1)

| | W | | | θ | V | γ |
|---|---|---|---|---|---|---|

Oil $$\begin{bmatrix} 0.017 & -0.666 & -0.280 \\ 0.306 & 0.707 & -0.229 \\ 0.434 & 0.123 & 0.694 \end{bmatrix} \begin{bmatrix} 1.097 \\ 0.631 \\ -0.537 \end{bmatrix} \quad -0.350 \quad 0.273$$

Water $$\begin{bmatrix} -0.439 & -0.120 & 0.837 \\ -0.035 & 0.467 & -0.587 \\ 1.255 & 0.276 & 0.427 \end{bmatrix} \begin{bmatrix} 1.084 \\ 0.858 \\ -0.078 \end{bmatrix} \quad -0.628 \quad 0.312$$

Emulsion $$\begin{bmatrix} -0.200 & 0.582 & 0.625 \\ 0.559 & -0.046 & 0.230 \\ 0.588 & 0.850 & 0.842 \end{bmatrix} \begin{bmatrix} 0.383 \\ 0.496 \\ -0.381 \end{bmatrix} \quad 0.842 \quad 0.759$$

(TABLE 8)

Sample (2)

| | W | | | θ | V | γ |
|---|---|---|---|---|---|---|

Oil $$\begin{bmatrix} 0.387 & 0.521 & 0.259 \\ 0.273 & -0.503 & -0.231 \\ -0.859 & -0.335 & 0.595 \end{bmatrix} \begin{bmatrix} -0.070 \\ 0.841 \\ 1.000 \end{bmatrix} \quad -0.699 \quad -1.484$$

Water $$\begin{bmatrix} -0.914 & 0.126 & 0.666 \\ 0.538 & -0.172 & -1.139 \\ -0.731 & -0.400 & -0.119 \end{bmatrix} \begin{bmatrix} -0.706 \\ 0.056 \\ -0.470 \end{bmatrix} \quad -0.124 \quad 0.500$$

Emulsion $$\begin{bmatrix} 0.270 & -3.519 & 1.339 \\ 0.392 & 0.664 & -1.431 \\ 1.066 & 0.225 & -0.320 \end{bmatrix} \begin{bmatrix} -0.810 \\ -0.635 \\ -0.843 \end{bmatrix} \quad -1.548 \quad 2.609$$

(TABLE 9)

Sample (3)

| | W | | | θ | V | γ |
|---|---|---|---|---|---|---|

Oil $$\begin{bmatrix} 1.263 & 0.660 & -0.706 \\ -0.172 & -1.139 & 0.056 \\ -0.400 & -0.936 & -0.119 \end{bmatrix} \begin{bmatrix} -1.237 \\ -0.731 \\ -0.470 \end{bmatrix} \quad -0.500 \quad -0.538$$

Water $$\begin{bmatrix} 0.270 & -3.519 & 1.339 \\ 0.393 & 0.665 & -1.430 \\ 1.070 & 0.225 & 0.979 \end{bmatrix} \begin{bmatrix} -0.810 \\ -0.635 \\ 3.615 \end{bmatrix} \quad -1.548 \quad 2.609$$

Emulsion $$\begin{bmatrix} 0.231 & -1.471 & 0.538 \\ -0.711 & 0.542 & -1.494 \\ -0.322 & 0.197 & -1.097 \end{bmatrix} \begin{bmatrix} -0.497 \\ -0.494 \\ 0.383 \end{bmatrix} \quad 2.076 \quad -0.636$$

If an input-output model formula is made with the use of these respective coefficients, the estimate of the layer condition may be effected from the input-output model formula.

Figure 8:
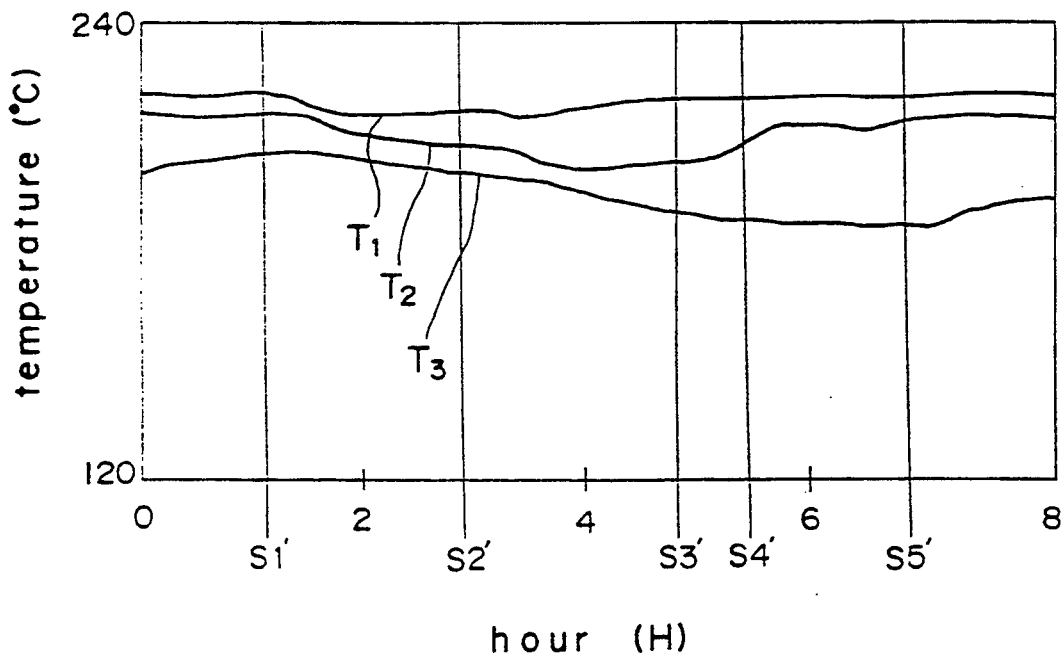
FIG. 8 is a chart showing the time lapse data of detection temperatures in the respective sampling positions used for the estimate in the second embodiment.

Time lapse temperature data shown in FIG. 8 are used as input values to be used for estimation. The moving variance values are obtained respectively even with respect to the respective temperatures T1 through T3 at the sampling time S1' through S5' as inputs Ii in a numerical formula 4 so as to show in FIG. 9 the output values obtained by it.

The layer condition of the samples (1) through (3) investigated in the above described sampling positions is shown in Table 10 as the comparison data with respect to the output values estimated in this manner.

(TABLE 10)

| | | S1' | S2' | S3' | S4' | S5' |
|---|---|---|---|---|---|---|
| Sample (1) | Oil | 1 | 1 | 1 | 1 | 1 |
| | Emulsion | 0 | 0 | 0 | 0 | 0 |
| | Water | 0 | 0 | 0 | 0 | 0 |

(TABLE 10)-continued

| | | S1' | S2' | S3' | S4' | S5' |
|---|---|---|---|---|---|---|
| Sample (2) | Oil | 0 | 0 | 1 | 1 | 1 |
| | Emulsion | 1 | 1 | 0 | 0 | 0 |
| | Water | 0 | 0 | 0 | 0 | 0 |
| Sample (3) | Oil | 0 | 0 | 0 | 0 | 1 |
| | Emulsion | 0 | 0 | 1 | 1 | 0 |
| | Water | 1 | 1 | 0 | 0 | 0 |

Figure 9:
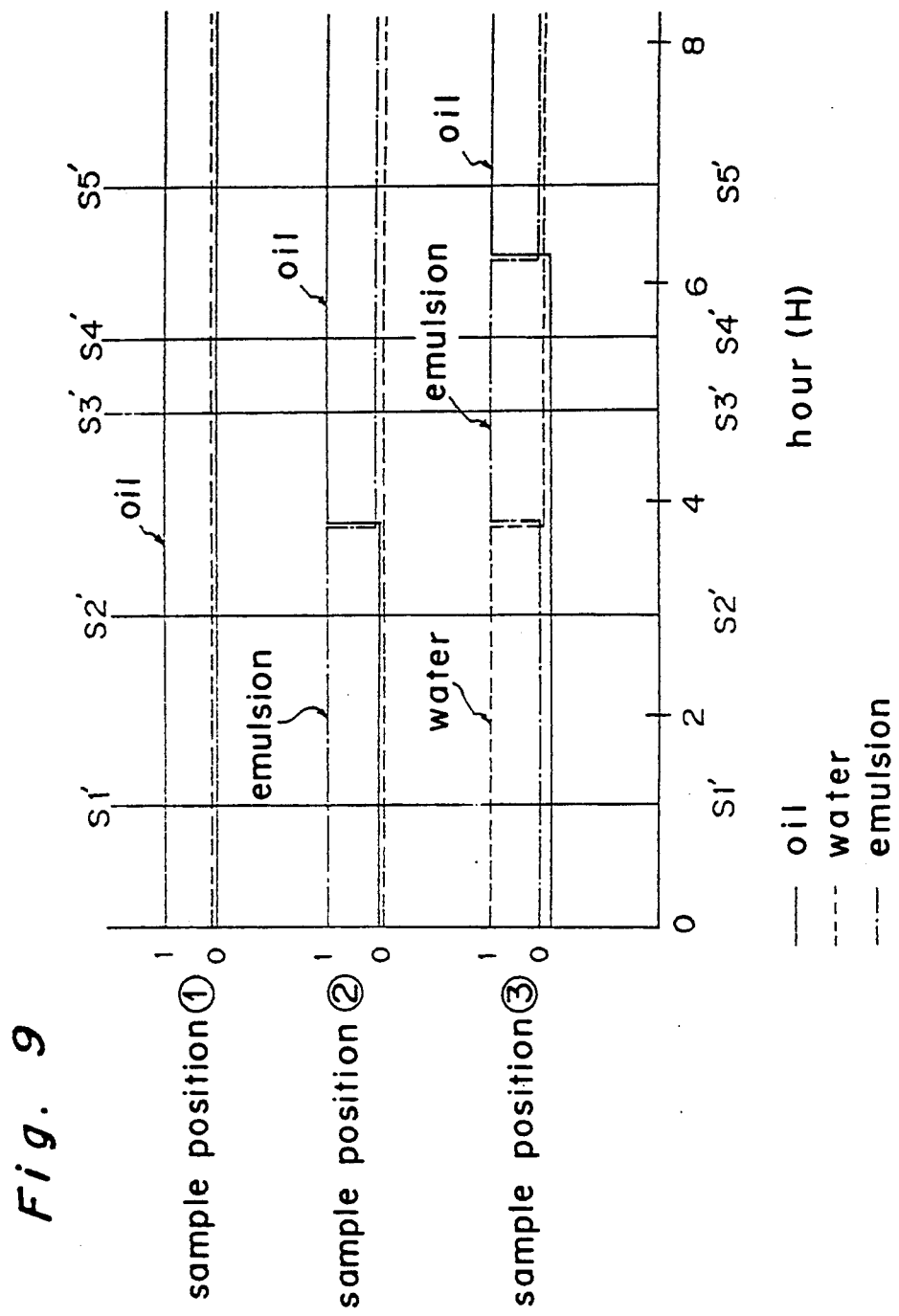
FIG. 9 is a chart showing a layer condition obtained in the second embodiment.

As clear from the comparison between the estimate value in FIG. 9 and the comparison data in Table 10, it is confirmed that this case is also considerably coincident in conformity.

Although the sampling positions are three in the above described embodiment, more samplings are preferable so as to improve the detection accuracy. In order to improve the detection accuracy, it is desirable to construct an input-output model with the measurement values of or mathematically processed values of the supply flow rate and exhaust flow rate of the oil and the water, supply steam flow rate and so on, as inputs, together with temperatures shown in the above described embodiment.

As is clear from the foregoing description, according to the arrangement of the present invention, in order to detect the layer condition, the measurement values of temperatures and so on in a system as a whole or the mathematically processed values of the measurement values are provided as inputs, the layer condition at this time is outputted, processed by a neurocomputer so as to compose an input-output model. As the layer condition at this time is adapted to be estimated with the use of the input-output model, the layer condition may be properly detected even when a system as an object is high at temperature, pressure or the dirt, the emulsion are larger in extent.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of detecting a layer level condition when vertically different liquids are layers in a system, comprising the steps of inputting to a neurocomputer at least one type of measurement values to be obtained in a time series comparison from the system, comparing first signals to be outputted from the neurocomputer with second signals showing a layer level condition determined by the actual samplings of a plurality of portions in the vertical direction of the system at this time, adjusting the weights showing the strength of the combination from the inputs in the neurocomputer to the outputs, making an input-output model having as coefficients the adjusted weight, inputting the at least one type of measurement values to the input-output model, and recognizing the layer level condition from the outputs at this time, wherein the at least one type of measurement values of the system includes temperature, pressure, and flow rate.

2. The method in accordance with the claim 1, wherein the mathematically processed at least one type of measurement values is a variance of the at least one type of measurement values.

3. The method in accordance with the claim 1, wherein the at least one measurement value is temperature, and further comprising the step of obtaining the average value of the temperature measurement values for each of the plurality of portions or the average value of the low frequency components to be included in the temperature measurement values.

4. A method of detecting a layer level condition when different liquids are arranged vertically in layers by the use of a neurocomputer, comprising the steps of inputting to the neurocomputer at least one type of measurement values in a system, comparing first signals to be outputted by the neurocomputer with second signals showing a layer level condition determined by the actual samplings of a plurality of portions in the vertical direction of the system at this time, adjusting the weights showing the strength of the combination from the inputs in the neurocomputer to the outputs until the difference between said signals becomes a normal value or lower, making an input-output model having as coefficients the adjusted weights, inputting the at least one type of measurement values to the input-output model, and recognizing the layer level condition from the output at this time, wherein the at least one type of measurement values of the system includes temperature, pressure, and flow rate.

5. A method of detecting a layer level condition when vertically different liquids are layers in a system, comprising the steps of obtaining at least one type of measurement values in a time series comparison from the system, mathematically processing the at least one type of measurement values, inputting to a neurocomputer the mathematically processed at least one type of measurement values, comparing first signals to be outputted from the neurocomputer with second signals showing a layer level condition determined by the actual samplings of a plurality of portions of the system at this time, adjusting the weights showing the strength of the combination from the inputs in the neurocomputer to the outputs, making an input-output model having as coefficients the adjusted weight, inputting the mathematically processed at least one type of measurement values to the input-output model, and recognizing the layer level condition from the outputs at this time, wherein the at least one type of measurement values of the system includes temperature, pressure, and flow rate.

* * * * *